United States Patent Office 3,536,756
Patented Oct. 27, 1970

3,536,756
PROCESS FOR THE PRODUCTION OF BIS-HALOGENO CARBONYL AMINES
Gerhard Zumach, Cologne-Stammheim, and Engelbert Kühle, Bergisch-Gladbach, Germany, assignors to Farbenfabriken Bayer Aktiengesellschaft, Leverkusen, Germany, a corporation of Germany
No Drawing. Filed Feb. 27, 1967, Ser. No. 619,036
Claims priority, application Germany, Apr. 1, 1966, F 48,829
Int. Cl. C07c 51/58, 101/20
U.S. Cl. 260—544
9 Claims

ABSTRACT OF THE DISCLOSURE

Bis-halogeno carbonyl amines are obtained when 3,5-dioxo-1,2,4-dithiazolidines, which are substituted at the nitrogen atom by an optionally substituted alkyl-, aralkyl- respectively aryl radical, are treated with halogenating agents preferably chlorine and bromine. The reaction is performed in the temperature range of from 0 to 100° C., preferably in the presence of an inert organic diluent.

---

It has been found that bis-halogeno carbonyl amines can be obtained by reacting 3,5-dioxo-1,2,4-dithiazolidines corresponding to the formula

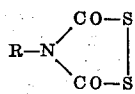

in which R represents an alkyl or aralkyl radical optionally substituted by halogen atoms, or an optionally substituted aryl radical, with halogens or compounds which split off halogen (hereinafter referred to as halogen donors) at temperatures in the range of from approximately 0° C. to approximately 100° C., preferably in the presence of an inert organic diluent.

Preferred alkyl radicals optionally substituted by halogen atoms, 1 to 3 chlorine or bromine atoms in particular, are those containing 1 to 3 carbon atoms, whilst preferred aralkyl radicals optionally substituted in the same way are those with an alkylene radical containing between 1 and 2 carbon atoms, and phenyl as the aryl radical. Phenyl and naphthyl are mentioned as preferred aryl radicals which are optionally substituted either completely or in part. The following are mentioned as examples of substituents on the aryl radical: alkyl with 1 to 4 carbon atoms, alkoxy with 1 to 4 carbon atoms, halogen atoms (preferably chlorine, fluorine or bromine), trifluoromethyl and nitro groups.

Halogens preferably used for the reaction include chlorine and bromine. Halogen donors are in particular sulphuryl chloride and phosphorus pentachloride.

The dioxodithiazolidines used as starting compounds are also new and, according to one of the applicants' earlier proposals, can be obtained by reacting formamides with chlorocarbonyl sulphene chloride. Their preparation is described with reference to the following example:

52 g. of chlorocarbonyl sulphene chloride (0.4 mol) are added dropwise at room temperature to a solution of 13 g. of N-methyl formamide (0.02 mol) in 200 ml. of benzene. The solution is heated to 50° C. until there is no further evolution of gas. This is followed by filtration, concentration in vacuo and distillation in a high vacuum. 12 g. of N-methyl-3, 5-dioxo-1,2,4-dithiazolidine corresponding to the formula:

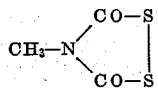

(B.P.: 78–80° C./0.2 torr; M.P.: 38° C.) are obtained.

The other 3,5-dioxo-1,2,4-dithiazolidines used for the process can be similarly prepared.

The following are mentioned as examples of these compounds:

N-propyl-3,5-dioxo-1,2,4-dithiazolidine,
N-isopropyl-,
N-2-chloroethyl-,
N-2-bromoethyl-,
N-benzyl,
N-3,4-dichlorobenzyl-,
N-phenyl-,
N-4-chlorophenyl-,
N-2,4-dichlorophenyl-,
N-3,4-dichlorophenyl-,
N-2,4,5-trichlorophenyl-,
N-pentachlorophenyl-,
N-4-bromophenyl-,
N-4-trifluoromethylphenyl-,
N-tolyl-,
N-4-tert.-butyl-phenyl-,
N-2-methyl-4-chlorophenyl-,
N-2-methyl-4,5-dichlorophenyl-,
N-3-nitrophenyl-,
N-4-nitrophenyl-,
N-2,4-dinitrophenyl-,
N-2-chloro-4-nitrophenyl-,
N-4-methoxyphenyl-,
N-4-butoxyphenyl,
N-(3-chloro-4-methoxy-phenyl)-3,5-dioxo-1, 2,4-dithiazolidine.

The process according to the invention is illustrated by way of example with reference to the reaction of N-methyl-3,5-dioxo-1,2,4-dithiazolidine with chlorine:

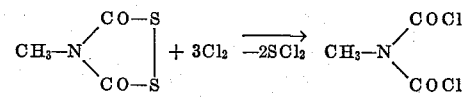

The reaction is preferably carried out in the presence of an inert organic diluent. Where the reaction is carried out in the presence of solvents, solvents which do not react or react very sluggishly with halogen or the reaction products are used. Suitable solvents include, for example carbon tetrachloride, chlorobenzene, dichlorobenzene and glacial acetic acid.

The reaction temperature can be varied within wide limits. In general, the reaction is carried out at temperatures of from approximately 0° C. to approximately 100° C., preferably from 30° C. to 50° C.

The reaction is generally carried out, for example, by introducing a calculated quantity of chlorine (3 mols) into a solution or suspension of the dioxo-dithiazolidine, or by adding dropwise a calculated quantity of either bromine or a halogen donor, for example sulphuryl chloride, in the same solvent. An excess of halogen or halogen donor up to about 50% and preferably between 10% and 20%, has proved to be favourable. The reaction may also be carried out in the reverse order by adding the solution of the dioxo-dithiazolidine dropwise to a solution either of halogen or of a halogen donor. The new compounds are obtained in liquid or crystalline form.

The bis-halogenocarbonylamines obtainable in accordance with the invention are valuable intermediates for the production of plastics auxiliaries and, in addition, may be used, for example, for the production of 3,5-dioxotriazolidines (German Pat. Nos. 1,200,313; 1,200,824 and 1,203,272). The 3,5-dioxotriazolidines can be obtained by reacting the bis-halogeno-carbonylamines with hydrazine derivatives, optionally in the presence of a tertiary organic base (for example triethylamine).

EXAMPLE 1

50 g. of chlorine (20% excess) are introduced at 40° C.–50° C. into a solution of N-methyl-3,5-dioxo-1,2,4-dithiazolidine (0.2 mol) in 150 ml. of carbon tetrachloride. Both the solvent and the sulphur dichloride formed are removed in a water-jet vacuum in the absence of moisture. The residue is distilled in a high vacuum. 26 g. (86% of the theoretical) of N-methyl-bis-chloro-carbonylamine corresponding to the formula:

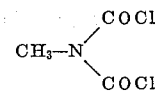

(B.P.: 30–31° C./0.2 torr) are obtained in the form of a pale yellow coloured liquid.

Analysis.—Calcd. (percent): C, 23.10; H, 1.94; N, 8.98; Cl, 45.5. Found (percent): C, 23.35; H, 1.86; N, 8.72; Cl, 45.5.

EXAMPLE 2

25 g. of chlorine (20% excess) are introduce at 40° C.–50° C. into a suspension of 21 g. of N-phenyl-3,5-dioxo-1,2,4-dithiazolidine (0.1 mol) in 300 ml. of carbon tetrachloride, the starting substance gradually entering into solution. On completion of the reaction, both the solvent and the sulphur dichloride formed are distilled off at reduced pressure. The initially oily residue crystallises on rubbing. Following recrystallisation from cyclohexane, 16 g. (73% of the theoretical) of N-phenyl-bis-chloro-carbonylamine corresponding to the formula:

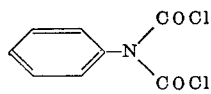

(M.P.: 63–64° C.) are obtained in the form of colourless needles.

Analysis.—Calcd. (percent): C, 44.10; H, 2.31; N, 6.42; Cl, 32.45. Found (percent) C, 44.29; H, 2,61; N, 6.41; Cl, 31.80.

The following compounds are obtained as described in Example 2:

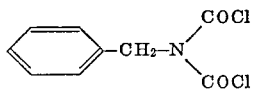

B.P. 96° C.–97° C./0.2 torr.

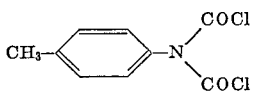

B.P. 120° C.–122° C./0.4 torr.
M.P. 58° C.

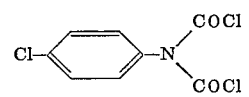

M.P. 106° C.–108° C.

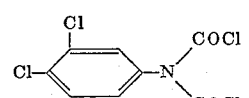

M.P. 101° C.–103° C.

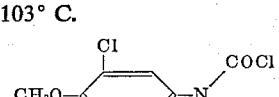

M.P. 134° C.–136° C.

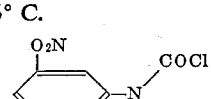

M.P. 59° C.–60.5° C.

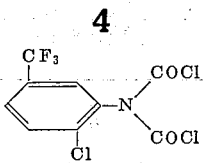

M.P. 44° C.–45° C.

EXAMPLE 3

25 g. of chlorine are introduced at 40° C.–50° C. into a solution of 18 g. of N-propyl-3,5-dioxo-1,2,4-dithiazolidine (0.1 mol) in 250 ml. of glacial acetic acid. The product is concentrated in a water-jet vacuum and the oily residue is distilled in a high vacuum. 6 g. (33% of the theoretical) of N-propyl-bis-chlorocarbonylamine corresponding to the formula:

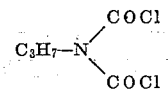

(B.P. 43–45° C./0.3 torr) are obtained.

EXAMPLE 4

203 g. of sulphuryl chloride (0.15 mol) are added dropwise to a solution of 45 g. of N-methyl-3,5-dioxo-1,2,4-dithiazolidine (0.3 mol) in 200 ml. of carbon tetrachloride. The mixture is heated until no more $SO_2$ is given off. After working up in the usual way, 21 g. (45% of the theoretical) of N-methyl-bis-chlorocarbonylamine (B.P. 38–39° C./0.5 torr) are obtained.

EXAMPLE 5

A solution of 45 g. of N-methyl-3,5-dioxo-1,2,4-dithiazolidine (0.3 mol) is added dropwise at 50° C.–60° C. to a solution of 160 g. of bromine (10% excess) in 200 ml. of carbon tetrachloride. After 5 hours' stirring at the same temperature, the solvent, excess bromine and the sulphur dibromide formed are removed in a water-jet vacuum in the absence of moisture. The residue is fractionated twice in a high vacuum. 15 g. (20% of the theoretical) of N-methyl - bis - bromocarbonylamine corresponding to the formula:

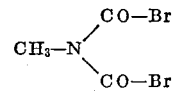

(B.P. 67° C.–69° C./0.3 torr) are obtained in the form of a reddish liquid. 29 g. (65% of the theoretical) of the starting compound are recovered.

We claim:
1. Bis-halogeno carbonyl amines of the formula

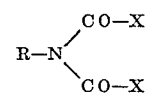

wherein X is a halogen selected from the group consisting of chlorine and bromine and wherein R is a member selected frdm the group consisting of lower alkyl; halo (lower alkyl) containing 1 to 3 halogens selected from at least one member of the group consisting of chlorine and bromine; benzyl, halobenzyl containing 1 to 3 halogens on the phenyl ring selected from at least one member of the group consisting of chlorine and bromine; phenyl ethyl; phenyl ethyl containing 1 to 3 halogens on the phenyl ring selected from at least one member of the group consisting of chlorine and bromine; phenyl; phenyl having at least one substituent selected from at least one member of the group consisting of lower alkyl, lower alkoxy and halogen, and substituents selected from at least one member of the group consisting of trifluoromethyl and nitro; naphthyl; and naphthyl having at least one substituent selected from at least one member of the group consisting of lower alkyl, lower alkoxy and halogen, and substituents selected from at least one member of the group consisting of trifluoromethyl and nitro.

2. Amines as claimed in claim 1, wherein said first-mentioned lower alkyl and said halo (lower alkyl) each contain 1 to 3 carbon atoms.

3. Amines as claimed in claim 1, wherein said lower alkoxy contains 1 to 4 carbon atoms.

4. Amines as claimed in claim 1, wherein said alkyl substituents on an aryl ring contain 1 to 4 carbon atoms.

5. Amines as claimed in claim 1, wherein said halogen substituted on the aryl ring is selected from the group consisting of chlorine, fluorine and bromine.

6. Amines as claimed in claim 1, wherein X is chlorine and wherein R is a member selected from the group consisting of methyl, phenyl, methyl phenyl, phenyl methyl, chlorophenyl, dichlorophenyl, chloromethoxyphenyl, nitrophenyl, chlorotrifluorophenyl, and propyl.

7. Amines as claimed in claim 1, wherein X is bromo and R is methyl.

8. A process for the production of bis-halogeno carbonyl amines, wherein a 3,5-dioxo-1,2,4-dithiazolidine corresponding to the formula

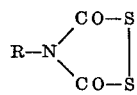

wherein R is a member selected from the group consisting of lower alkyl, halo (lower alkyl) containing 1 to 3 halogens selected from at least one member of the group consisting of chlorine and bromine; benzyl; halobenzyl containing 1 to 3 halogens on the phenyl ring selected from at least one member of the group consisting of chlorine and bromine; phenyl ethyl; phenyl ethyl containing 1 to 3 halogens on the phenyl ring selected from at least one member of the group consisting of chlorine and bromine; phenyl; phenyl having at least one substituent selected from at least one member of the group consisting of lower alkyl, lower alkoxy and halogen, and substituents selected from at least one member of the group consisting of trifluoromethyl and nitro; naphthyl; and naphthyl having at least one substituent selected from at least one member selected from the group consisting of lower alkyl, lower alkoxy and halogen, and substituents selected from at least one member of the group consisting of trifluoromethyl and nitro; is reacted with a halogenation agent, selected from the group consisting of chlorine, bromine sulphuryl chloride and phosphorous pentachloride at a temperature in the range of from approximately 0° C. to approximately 100° C.

9. A process as claimed in claim 8 in which the reaction is effected in the presence of an inert organic diluent.

References Cited

FOREIGN PATENTS 1,200,313  9/1965  Germany.

LORRAINE A. WEINBERGER, Primary Examiner

E. J. GLEIMAN, Assistant Examiner

U.S. Cl. X.R.

260—306.7, 308